US007897128B2

(12) United States Patent
Quinn et al.

(10) Patent No.: US 7,897,128 B2
(45) Date of Patent: Mar. 1, 2011

(54) PREPARATION OF COMPLEX METAL OXIDES

(75) Inventors: Robert Quinn, Macungie, PA (US);
Diwakar Garg, Emmaus, PA (US);
Frederick Carl Wilhelm, Zionsville, PA (US); Terry Lee Slager, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 950 days.

(21) Appl. No.: 11/737,942

(22) Filed: Apr. 20, 2007

(65) Prior Publication Data

US 2008/0260621 A1    Oct. 23, 2008

(51) Int. Cl.
*C01G 45/00* (2006.01)

(52) U.S. Cl. .................. 423/263; 423/593.1; 423/594.2; 423/594.4; 423/594.6; 423/594.8; 423/595; 423/599

(58) Field of Classification Search .................. 423/263, 423/594.2, 594.4, 594.6, 594.8, 595, 599, 423/593.1
See application file for complete search history.

(56) References Cited

U.S. PATENT DOCUMENTS

| | | | |
|---|---|---|---|
| 2,904,395 | A | 9/1959 | Downs et al. |
| 4,578,089 | A | 3/1986 | Richter et al. |
| 4,657,752 | A | 4/1987 | Lyon |
| 5,055,441 | A | 10/1991 | McCarron, III et al. |
| 5,827,496 | A | 10/1998 | Lyon |
| 6,007,699 | A | 12/1999 | Cole |
| 6,238,816 | B1 | 5/2001 | Cable et al. |
| 6,322,766 | B1 | 11/2001 | Schicketanz et al. |
| 6,506,510 | B1 | 1/2003 | Sioui et al. |
| 6,682,838 | B2 | 1/2004 | Stevens |
| 6,761,838 | B2 | 7/2004 | Zeng et al. |
| 6,767,530 | B2 | 7/2004 | Kobayashi et al. |
| 6,972,301 | B2 | 12/2005 | Hurlburt et al. |
| 6,974,566 | B2 | 12/2005 | Sabacky et al. |
| 7,070,752 | B2 | 7/2006 | Zeng et al. |
| 2002/0010220 | A1 | 1/2002 | Zeng et al. |
| 2002/0071806 | A1 | 6/2002 | Sabacky et al. |
| 2003/0035770 | A1 | 2/2003 | Cole |
| 2003/0150163 | A1 | 8/2003 | Murata et al. |
| 2004/0191166 | A1 | 9/2004 | Hershkowitz et al. |
| 2005/0112056 | A1 | 5/2005 | Hampden-Smith |
| 2005/0229488 | A1 | 10/2005 | Stevens |
| 2005/0229490 | A1 | 10/2005 | Stevens et al. |
| 2005/0232856 | A1 | 10/2005 | Stevens et al. |
| 2006/0292066 | A1 | 12/2006 | Pez et al. |
| 2006/0292069 | A1 | 12/2006 | Pez et al. |
| 2007/0172418 | A1* | 7/2007 | Slager et al. .................. 423/651 |
| 2007/0172419 | A1 | 7/2007 | Peng et al. |

FOREIGN PATENT DOCUMENTS

| | | |
|---|---|---|
| EP | 0 411 506 A2 | 2/1991 |
| EP | 0 737 648 B1 | 10/1996 |
| EP | 1 134 187 A2 | 9/2001 |
| EP | 1 816 102 A2 | 8/2007 |
| WO | 99/02471 A1 | 1/1999 |

OTHER PUBLICATIONS

Ding, Y., "Adsorption-Enhanced Steam Methane Reforming", Chem. Eng. Sci. 55, (2000) pp. 3929-3940.

Balasubramanian, B., "Hydrogen from Methane in a Single-Step Process," Chem. Eng. Sci. 54 (1999) pp. 3543-3552.

Brun-Tsekhovoi, A. R., et al., "The Process of Catalytic Stream-Reforming of Hydrocarbons in the Presence of Carbon Dioxide Acceptor," Hydrogen Energy Progress VII, Proceedings of the 7th World Hydrogen Energy Conference, Moscow (vol. 2, 1988), pp. 885-900.

Zang, Z. C., et al., "Hydrogen Production from Methane and Water by Lattice Oxygen Transfer with Ce0.70Zr0.25Tb0.05O2-x," J. Alloys and Compounds, 323-324 (2001), pp. 97-101.

Nakahara, et al., "Synthesis and crystal structure of (Sr1-xCax)2 FeMnOy (x=0-1.0)", Elsevier Sicence B.V., Materials Letters, 30 (Feb. 1997) pp. 163-167.

Vidyasagar, K., et al., "A Convenient Route for the Synthesis of Complex Metal Oxides Employing Solid-Solution Precursors", American Chemical Society, Inorg. Chem. 1984, 23 pp. 1206-1210.

(Continued)

*Primary Examiner*—Steven Bos
(74) *Attorney, Agent, or Firm*—Bryan C. Hoke, Jr.

(57) ABSTRACT

The present invention provides a process for making a complex metal oxide comprising the formula $A_xB_yO_z$. The process comprises the steps of: (a) reacting in solution at a temperature of between about 75° C. to about 100° C. at least one water-soluble salt of A, at least one water-soluble salt of B and a stoichiometric amount of a carbonate salt or a bicarbonate salt required to form a mole of a carbonate precipitate represented by the formula $A_xB_y(CO_3)_n$, wherein the reacting is conducted in a substantial absence of carbon dioxide to form the carbonate precipitate and wherein the molar amount of carbonate salt or bicarbonate salt is at least three times the stoichiometric amount of carbonate or bicarbonate salt required to form a mole of the carbonate precipitate; and (b) reacting the carbonate precipitate with an oxygen containing fluid under conditions to form the complex metal oxide.

20 Claims, 1 Drawing Sheet

OTHER PUBLICATIONS

Aihara, M., et al; "Development of Porous Solid Reactant for Thermal-Energy Storage and Temperature Upgrade using Carbonation/Decarbonation Reaction"; Applied Energy; 2001; pp. 225-238.

Shin; "Separation of a Binary Gas Mixture by Pressure Swing Adsorption: Comparison of Different PSA Cycles"; Adsorption; vol. 1; 1995; pp. 321-333; XP-002464015.

Waldron, W.E., et al; "Parametric Study of a Pressure Swing Adsorption Process;" Adsorption, vol. 6; 2000; pp. 179-188; XP-002464014.

Hufton, J., et al., "Sorption Enhanced Reaction Process (SERP) for the Production of Hydrogen", Air Products and Chemicals, Inc., Allentown, PA 18195, Proceedings of the 2000 Hydrogen Program Review, NREL/CP-570-28890, pp. 1-12.

Horowitz, H.S., et al., "Phase Relations in the Ca-Mn-O System"; Mat. Res. Bull. vol. 13, pp. 1359-1369; 1978.

Vidyasagar, K., et al; "A Convenient Route for the Synthesis of Complex Metal Oxides Employing Solid-Solution Precursors"; Inorg. Chem.; vol. 23, No. 9, 1984; pp. 1206-1210; XP002487238.

\* cited by examiner

PREPARATION OF COMPLEX METAL OXIDES

BACKGROUND OF THE INVENTION

The present invention relates to processes for preparing complex metal oxides and to complex metal oxides useful as a source of oxygen and sorbent of carbon dioxide in redox hydrogen processes.

A typical redox hydrogen process is a two-step cyclic process for producing hydrogen on a large scale. In the first step, at least one hydrocarbon (e.g., methane) and steam are reacted in the presence of a complex metal oxide and a steam-hydrocarbon reforming catalyst under reaction conditions sufficient to form substantially pure hydrogen gas and a spent complex metal oxide:

$$CH_4 + ABO_x + 1.23\ H_2O = ACO_3 + 3.23\ H_2 + BO_{x-1.77},$$

where A is a first metal or combination of metals and B is a second metal or combination of metals, and X is typically an integer from about 1 to about 10.

The presence of the complex metal oxide provides an oxidant species that delivers oxygen to the process, and additionally provides the benefit of removing carbon dioxide from the hydrogen gas product stream according to the reactions:

$$ABO_n = ABO_{n-x} + x/2\ O_2$$

$$ABO_{n-x} + CO_2 = ACO_3 + BO_{n-x-1}$$

where A, B and X are as indicated above and n is a number that renders the oxide substantially charge neutral.

In the second step of a typical redox hydrogen process, the spent complex metal oxide is regenerated in the presence of air. As illustrated by the following equation, the regeneration step typically proceeds as follows:

$$ACO_3 + BO_{x-1.76} + 0.38\ O_2\ (\text{from air}) = ABO_x + CO_2$$

The redox hydrogen process is fully described in U.S. patent application Publication No. 2002/0010220, which is incorporated herein by reference in its entirety.

Although preparation of complex metal oxides is known in the art, improved methods of making the complex metal oxides are sought by those skilled in the art. For example, *Inorg. Chem.* 23, 1206-1210 (1984) discloses the synthesis of $Ca_2FeMnO_5$ from a carbonate precursor in which a solution of nitrate salts of Ca(II), Mn(II), and Fe(II) are precipitated by addition to hot, aqueous $NaHCO_3$ under continuous addition of $CO_2$. The resultant complex carbonate is calcined under an air or $O_2$ purge to yield the desired oxide.

Similarly, U.S. patent application Ser. No. 11/165,720 discloses the preparation of a redox active oxide, $Ca_2FeMnO_5$, by adding aqueous solutions of $Ca(NO_3)_2$, $MnCl_2$, and $Fe(NO_3)_3$ into hot, aqueous $NaHCO_3$ under continuous addition of gaseous $CO_2$ to precipitate complex corbonate followed by calcining the resultant complex carbonate under flowing $O_2$ to yield the oxide. Such processes, however, suffer from drawbacks. For example, the continuous addition of gaseous $CO_2$ during the reaction introduces yet another reagent into the process, which is potentially costly and requires storage of a pressurized gas.

*Mater. Lett.* 30, 163-167 (1997) discloses the preparation of $Ca_2FeMnO_y$ from $CaCO_3$, $MnCO_3$, and $Fe_2O_3$ by repeated calcinations of pellets of the materials at 1,150° C. to 1,200° C. Characterization of the oxide indicates that y=5.06. The powder X-ray diffraction (PXRD) pattern of the resultant oxide is similar to that of $SrMnO_{2.5}$ and $Ca_2Fe_2O_5$ and had a brownmillerite-like structure. Although practical at a small-scale bench operation, the energy requirements for the repeated calcinations make the process inefficient for a large-scale commercial manufacturing of such oxides.

Accordingly, there is a need in the art for a simpler, safer, and more efficient process for making redox active complex metal oxides that will serve as a useful source of oxygen and sorbent of carbon dioxide in redox hydrogen processes.

BRIEF SUMMARY OF THE INVENTION

The present invention provides in one aspect a process that satisfies this need for improved methods for making a complex metal oxide comprising the formula $A_xB_yO_z$ wherein A is at least one metallic element selected from the group consisting of elements of Groups 2, and 3, and the Lanthaide elements of the IUPAC Periodic Table of the Elements, which has an oxidation state ranging from +1 to +3; B is at least one metallic element having an oxidation state ranging from +1 to +7 selected from the group consisting of vanadium, chromium, manganese, iron, cobalt, copper, and nickel; O is an oxygen atom; x is a number from about 1 to about 10; y is a number greater than 0 and equal to or less than about 10 for each element B; and z is a number that renders the complex metal oxide substantially charge neutral, the process comprising the steps of: (a) reacting in solution at a temperature of between about 75° C. to about 100° C. at least one water-soluble salt of A, at least one water-soluble salt of B and a stoichiometric amount of a carbonate salt or a bicarbonate salt required to form a mole of a carbonate precipitate represented by the formula $A_xB_y(CO_3)_n$, wherein n is a number that renders the carbonate precipitate charge neutral, wherein the reacting is conducted in a substantial absence of carbon dioxide to form the carbonate precipitate and wherein the molar amount of carbonate salt or bicarbonate salt is at least three times the stoichiometric amount of carbonate or bicarbonate salt required to form a mole of the carbonate precipitate; and (b) reacting the carbonate precipitate with an oxygen containing gas at a temperature of from between about 650° C. to about 1,200° C. to form the complex metal oxide.

In another aspect, the invention provides a process for making a complex metal oxide comprising the formula $A_xB_yO_n$ wherein A is at least one metallic element selected from the group consisting of elements of Groups 2, and 3, and the Lanthanide elements of the IUPAC Periodic Table of the Elements, which has an oxidation state ranging from +1 to +3; B is at least one metallic element having an oxidation state ranging from +1 to +7 selected from the group consisting of vanadium, chromium, manganese, iron, cobalt, copper, and nickel; O is an oxygen atom; x is a number from about 1 to about 10; y is a number greater than 0 and equal to or less than about 10 for each element B; and z is a value that renders the complex metal oxide substantially charge neutral, the process comprising the steps of: (a) reacting in solution at a temperature of between about 75° C. to about 100° C. at least one water-soluble nitrate salt of A, at least one water-soluble nitrate salt of B and a stoichiometric amount of a carbonate salt or a bicarbonate salt required to form a carbonate precipitate represented by the formula $A_xB_y(CO_3)_n$ wherein n is a number that renders the carbonate precipitate substantially charge neutral, wherein the reacting is conducted in a substantial absence of carbon dioxide to form the carbonate precipitate and wherein the molar amount of the carbonate salt or bicarbonate salt is at least 3 times the stoichiometric amount of carbonate or bicarbonate salt required to form the carbonate precipitate; and (b) reacting the carbonate precipitate with air at a temperature of from between about 650° C. to about 1,200° C. to form the complex metal oxide.

In yet another aspect of the invention, the complex metal oxide comprises $Ca_2FeMnO_5$ which is made by: (a) forming a carbonate precipitate comprising $Ca_2FeMn(CO_3)_5$ by reacting $Ca(NO_3)_2$, $MnCl_2$, and $Fe(NO_3)_3$ in the presence of a stoichiometric excess of bicarbonate, said stoichiometric excess preferably being an amount of bicarbonate that is at least about 15 moles of bicarbonate salt for every mole of product $Ca_2FeMn(CO_3)_5$, and in certain embodiments from about 15 moles to about 50 moles of a bicarbonate salt for every mole of product $Ca_2FeMn(CO_3)_5$; and (b) exposing the carbonate precipitate to conditions effective to form the complex metal oxide. In certain preferred embodiments, the step (b) comprises reacting the carbonate precipitate with air at a temperature of from between about 650° C. to about 950° C. to form the complex metal oxide comprising $Ca_2FeMnO_5$.

DETAILED DESCRIPTION OF THE INVENTION

Figure 1:
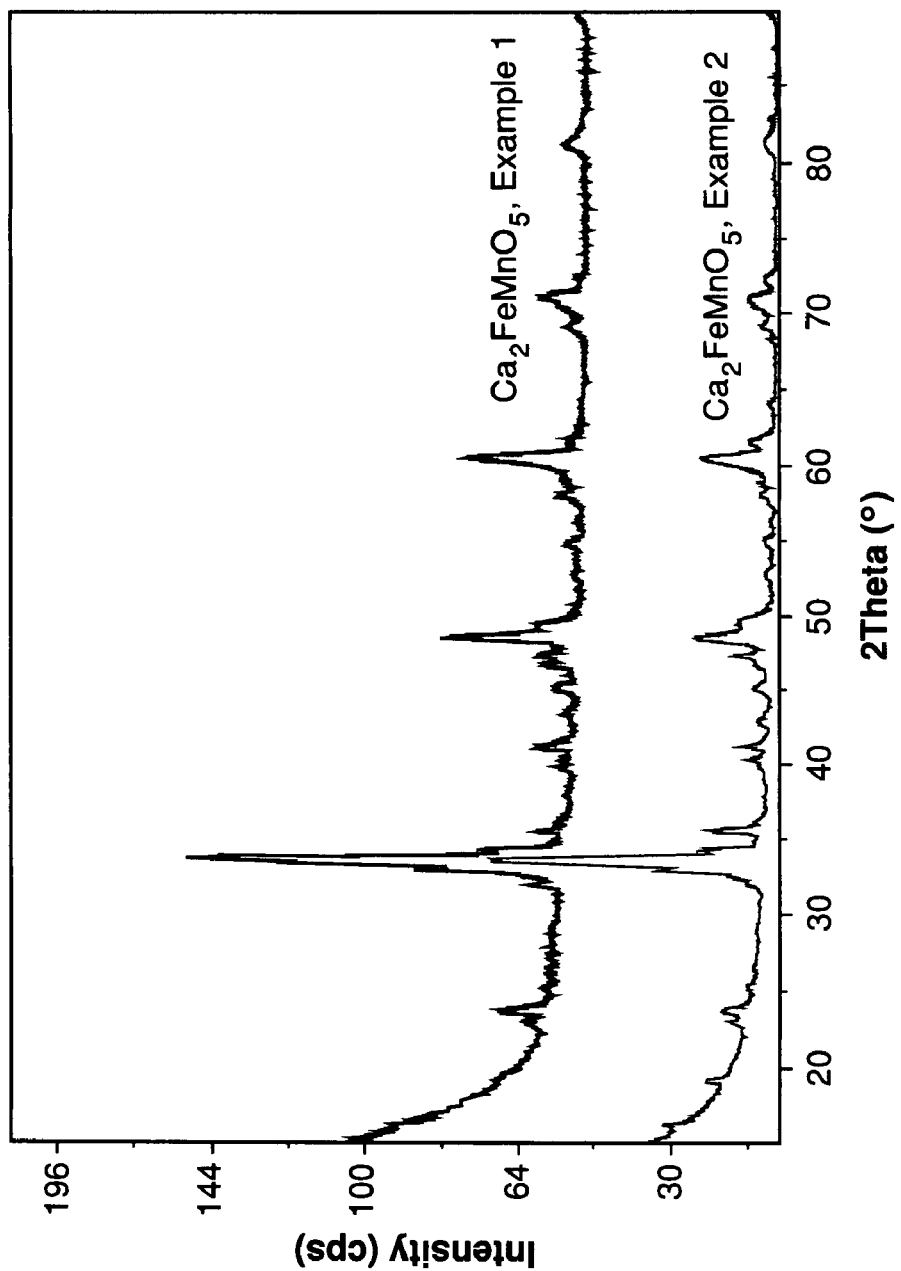
FIG. 1 illustrates PXRD patterns for $Ca_2FeMnO_5$ complex metal oxides made by procedures detailed in Examples 1 and 2.

As used herein, the term "complex metal oxide" means a chemical compound comprising oxygen and two or more elements that are regarded as metals in their pure unoxidized state at normal ambient conditions. Complex metal oxides may include, for example, ternary or quaternary metal oxides comprising two and three metallic elements, respectively, in combination with oxygen. In contrast to a complex metal oxide, a simple metal oxide is a combination of only one element and oxygen and is usually referred to as a binary oxide. This distinction between complex oxides and simple oxides is further explained with specific illustrations in "Comprehensive Inorganic Chemistry", Vol. 2, pp. 729-735, Pergamon Press (1975).

The complex metal oxides made by the process of the present invention are particularly suitable for use as a source of oxygen and an adsorbent of carbon dioxide in redox hydrogen processes; however, it should be understood by those skilled in the art that the complex metal oxides have wider applicability and can be used in any application for which complex metal oxides are useful.

The present invention provides a process for making a complex metal oxide comprising the formula $$A_xB_yO_z$$

wherein A is at least one metallic element selected from the group consisting of elements of Groups 2, and 3, and the Lanthaide elements of the IUPAC Periodic Table of the Elements, which has an oxidation state ranging from +1 to +3; B is at least one metallic element, and in certain preferred embodiments a combination of two or more metallic elements, each B having an oxidation state ranging from +1 to +7 selected from the group consisting of vanadium, chromium, manganese, iron, cobalt, copper, and nickel; O is an oxygen atom; x is a number from about 1 to about 10; y is a number greater than about 0 and equal to or less than about 10 for each element B; and z is a number that renders the complex metal oxide substantially charge neutral.

Preferably, metallic element A is a metallic element that is capable of forming a carbonate. Component B may comprise one or more metallic elements, each of which can form oxides having at least two different valences.

The complex metal oxides of the present invention may be bimetallic, trimetallic, or higher order metal complex oxides. Bimetallic oxides are also known as ternary oxides, while trimetallic oxides are also known as quaternary oxides.

In preferred embodiments of the present invention, the complex metal oxide comprises at least one complex metal oxide having the formula $Ca_2Mn_iFe_mO_q$ where $0 \leq i$ and $0 \leq m$, wherein $i+m=2$ and $4 \leq q \leq 7$; $Ca_{2-x}Mg_xMn_yFe_zO_n$ where $0.1 < x < 0.9$; $0 \leq y$ and $0 \leq z$, wherein $y+z=2$ and $4 \leq n \leq 7$; $Ca_2MnFeO_5$; $Ca_2Fe_2O_5$; $Ca_2Co_2O_5$; $Ca_2Mn_2O_5$; $CaMgFeMnO_5$; and $Ca_{2-p}Ln_p Fe_zMn_yO_n$ where $0.1 < p < 0.9$, $0 \leq y$ and $0 \leq z$, wherein $y+z=2$ and $4 \leq n \leq 7$, Ln is an element from lanthanide series of the Periodic Table of Elements, and n is a value chosen so as to render the complex metal oxide charge neutral. In more preferred embodiments of the invention, the complex metal oxide comprises a complex metal oxide selected from the group consisting of $Ca_2Fe_{0.5}Mn_{1.5}O_5$, $Ca_2Fe_{1.5}Mn_{0.5}O_5$, $Ca_2Fe_2O_5$, and $Ca_2Mn_2O_5$.

According to the present invention, the general synthetic approach used to prepare complex metal oxides comprises two steps. First, a carbonate precipitate is formed comprising the metallic elements A and B. Next, the carbonate precipitate is calcined in the presence of air or oxygen at an elevated temperature to form the complex metal oxide.

In the first step of the process, at least one water-soluble salt of A, at least one water-soluble salt of B and a carbonate salt or bicarbonate salt is reacted in solution. As used herein the phrase "a carbonate salt or bicarbonate salt" means either a carbonate salt or bicarbonate salt or a carbonate salt and a bicarbonate salt. In the process of the present invention, the carbonate salt or bicarbonate salt is present in a molar amount that is at least 3 times the stiochiometric amount of carbonate or bicarbonate salt required to form a mole of a carbonate precipitate represented by the formula $$A_xB_y(CO_3)_n,$$

wherein n is a number that renders the carbonate precipitate substantially charge neutral. This means that the carbonate salt or bicarbonate salt is present in the reaction mixture in a molar amount that is at least 3 times the value of n in the formula $A_xB_y(CO_3)_n$, wherein, in addition to representing the number that renders the carbonate precipitate substantially charge neutral, n represents the stoichiometric number of moles of carbonate needed to form the carbonate precipitate. Thus, at least 3 times the stoichiometric amount means that 3n moles of carbonate or bicarbonate salt are required to produce 1 mole of $A_xB_y(CO_3)_n$.

More preferably, the carbonate salt or bicarbonate salt is present in the reaction mixture in a molar amount that is at least about 5 times, and even more preferably at least about 7 times the stoichiometric value of n.

The use of a carbonate salt or bicarbonate salt in a molar amount that is less than 3 times the stoichiometric value typically produces complex metal carbonate and respective complex metal oxide that are deficient in calcium. The formation of calcium deficient complex metal oxide is undesirable because such calcium deficient complex metal oxides typically exhibit a significantly lower capacity of carbon dioxide chemisorption.

As used herein, the term "water-soluble" regarding suitable salts of A and B means that such salts are sufficiently soluble in water to result in a concentration of at least 10% of salt based on the weight of the solution.

Preferred water-soluble salts of A include salts of the cations Ca(II), Ba(II), Sr(II) and Mg(II) such as, for example, $Ca(NO_3)_2$, $CaCl_2$, $BaCl_2$, $Ba(NO_3)_2$, $Sr(NO_3)_2$, $SrCl_2$, $MgCl_2$, and $Mg(NO_3)_2$. The nitrate salts of the cations Ca(II), Ba(II), Sr(II) and Mg(II) are the most preferred.

Preferred water-soluble salts of B include salts of the cations Mn(II), Fe(II), and Fe(III) such as, for example, $MnCl_2$, $Fe(NO_3)_2$, $FeCl_2$, $Mn(NO_3)_2$, $FeCl_3$, and $Fe(NO_3)_3$. Essentially any soluble salt containing the cations Mn(II), and Fe(II) or Fe(III) can be used because the anions of these salts typically remain in solution as the carbonate precipitates. The solution can easily be separated from the precipitated product. The nitrate salts of the cations Mn(II), Fe(II), and Fe(III), however, are the most preferred.

In a preferred embodiment of the present invention, a mixture of at least one water-soluble salt of A and at least one water-soluble salt of B is reacted with a carbonate salt or a bicarbonate salt by adding the at least one water-soluble salt of A and at least one water-soluble salt of B to a heated aqueous solution of the carbonate salt or the bicarbonate salt. Preferably, the carbonate salt or bicarbonate salt is selected from the group consisting of $NaHCO_3$, $KHCO_3$, $CsHCO_3$, $Na_2CO_3$, and $K_2CO_3$. In more preferred embodiments, a bicarbonate salt is the reactant. In the most preferred embodiments, the bicarbonate salt is sodium bicarbonate.

In preferred embodiments, the reaction is conducted at a temperature of between from about 75° C. and about 100° C. and, more preferably at between about 80° C. and about 90° C.

In certain preferred embodiments of the invention, the carbonate salt or a bicarbonate salt is present in the reaction mixture in a molar amount that is 3 to 10 times the value of n. By way of example, to form a carbonate precipitate comprising $Ca_2FeMn(CO_3)_5$ (where n is 5) according to the present invention by adding a solution containing $Ca(NO_3)_2$, $Fe(NO_3)_3$, and $MnCl_2$ to a hot $NaHCO_3$ solution, about 5 moles of carbonate or bicarbonate salt is stoichiometrically required for each mole of $Ca_2FeMn(CO_3)_5$ produced in the reaction. Thus, a molar amount of carbonate or bicarbonate salt that is 3 to 10 times the stoichiometrically required amount, for example, from about 15 to about 50 moles for every mole of $Ca_2FeMn(CO_3)_5$ produced in the reaction.

In preferred embodiments of the invention, the carbonate precipitate represented by the formula $A_xB_y(CO_3)_n$ is formed by adding the at least one water-soluble salt of A and the at least one water-soluble salt of B to a heated solution of the carbonate salt or bicarbonate salt in a substantial absence of carbon dioxide. As used herein, the phrase "substantial absence of carbon dioxide" means that carbon dioxide is not deliberately added to the mixture and may be present in the mixture in a minor amount through, for example, absorption from the air. In this regard, the prior art teaches that $CO_2$ is continuously added to the carbonate or bicarbonate salt solution during the reaction because heating the solution may cause the carbonate or bicarbonate salt to decompose and liberate $CO_2$. By adding $CO_2$ into the heated carbonate or bicarbonate solution through, for example, a bubbler, equilibrium is shifted to favor the carbonate or bicarbonate salt, thus inhibiting decomposition of the carbonate or bicarbonate salt. Applicants have surprisingly found that when the molar concentration of the carbonate or bicarbonate salt is present in the reaction mixture in at least three times in stoichiometric excess relative to the stoichiometric number of moles of carbonate needed to form the carbonate precipitate, it is not necessary to add $CO_2$ during the reaction to form the carbonate precipitate.

In the second step of the process, the carbonate precipitate of formula (I) is exposed to conditions effective to form the complex metal oxide. In one embodiment, this step comprises reacting the carbonate precipitate with an oxygen-containing fluid such as, for example, $O_2$ or air. Preferably, the reaction is carried out at a temperature of from between about 650° C. to about 1,200° C. to form the complex metal oxide. This step is also referred to herein as "calcination" or a "calcine" step.

In preferred embodiments, calcination is performed at about 750° C. under flowing air. This temperature is preferred because it is a temperature above which carbonate decomposition does not typically occur in the time required to form the complex metal oxide. Higher or lower calcination temperatures can be used. For example, calcination above 750° C. to a maximum of 1,100° C. typically results in some modest differences in phase composition but the reactivity of the product oxides are virtually identical. In principle, calcination temperatures as low as 650° C. can be used but carbonate decomposition becomes relatively slow and, consequently, calcination times will be longer.

In one embodiment of the present invention, a complex metal oxide comprising $Ca_2FeMnO_5$ is made by forming a carbonate precipitate comprising $Ca_2FeMn(CO_3)_5$ by (a) reacting $Ca(NO_3)_2$, $MnCl_2$, and $Fe(NO_3)_3$ with 3 to 10 times the stoichiometric amount of carbonate or bicarbonate salt, wherein the stoichiometric amount of carbonate or bicarbonate salt is 5 moles of carbonate or bicarbonate salt for every mole of $Ca_2FeMn(CO_3)_5$ precipitate produced and (b) exposing the carbonate precipitate to conditions effective to form the complex metal oxide. In certain preferred embodiments, the step (b) comprises reacting the carbonate precipitate with air at a temperature of from between about 650° C. to about 950° C. to form the complex metal oxide comprising $Ca_2FeMnO_5$.

In another embodiment of the present invention, a complex metal oxide comprising $Ca_2FeMnO_5$ is made by (a) reacting $Ca(NO_3)_2$, $MnCl_2$, and $Fe(NO_3)_3$ with 3 to 10 times the stoichiometric amount of carbonate or bicarbonate salt for every mole of $Ca_2FeMn(CO_3)_5$ precipitate produced; and (b) reacting the carbonate precipitate comprising $Ca_2FeMn(CO_3)_5$ with air at a temperature of from between about 650° C. to about 950° C. to form the complex metal oxide comprising $Ca_2FeMnO_5$. In certain preferred embodiments, the carbonate or bicarbonate salt is present in an amount of from about 15 to about 50 moles for every mole of precipitate produced.

In still another embodiment of the present invention, a complex metal oxide comprising $Ca_2FeMnO_5$ is made by reacting $Ca(NO_3)_2$, $Mn(NO_3)_2$, and $Fe(NO_3)_3$ with 3 to 10 times the stoichiometric amount of a carbonate or bicarbonate salt for every mole of $Ca_2FeMn(CO_3)_5$ precipitate produced; and reacting the carbonate precipitate with air at a temperature of from between about 650° C. to about 950° C. to form the complex metal oxide comprising $Ca_2FeMnO_5$. In certain preferred embodiments, the carbonate or bicarbonate salt is present in an amount of from about 15 to about 50 moles for every mole of precipitate produced.

In yet another embodiment of the present invention, a complex metal oxide comprising $Ca_2FeMnO_5$ is made by reacting molar quantities of $Ca(NO_3)_2$, $MnCl_2$, and $Fe(NO_3)_3$ such that the molar ratio of Ca to the sum of Fe to Mn is equal to about 1 and the molar ratios of Fe and Mn to Ca range from about 0 to about 1 with from about 15 to about 50 moles of a carbonate or bicarbonate salt for every mole of $Ca_2FeMn(CO_3)_5$ precipitate produced; and contacting the carbonate precipitate comprising $Ca_2FeMn(CO_3)_5$ with air at a temperature of from between about 650° C. to about 950° C. to form the complex metal oxide comprising $Ca_2FeMnO_5$.

In another embodiment of the present invention, a complex metal oxide comprising $Ca_2Fe_2O_5$ is made by forming a carbonate precipitate comprising $Ca_2Fe_2(CO_3)_4$ by reacting $Ca(NO_3)_2$ and $FeCl_2$ with 3 to 10 times the stoichiometric amount of carbonate or bicarbonate salt required to form a mole of $Ca_2Fe_2(CO_3)_4$ precipitate; and (b) exposing the carbonate precipitate to conditions effective to form the complex metal oxide. In certain preferred embodiments, the step (b) comprises reacting the carbonate precipitate with air at a temperature of from between about 650° C. to about 950° C. to form the complex metal oxide comprising $Ca_2Fe_2O_5$. In certain preferred embodiments, the amount of carbonate or bicarbonate salt is at least about 12 moles of carbonate or bicarbonate salt for every mole of $Ca_2Fe_2(CO_3)_4$ produced, and in other embodiments from about 12 moles to about 40 moles of a carbonate or bicarbonate salt for every mole of $Ca_2Fe_2(CO_3)_4$ produced.

In still another embodiment of the present invention, a complex metal oxide comprising $Ca_2Fe_2O_5$ is made by reacting $Ca(NO_3)_2$ and $Fe(NO_3)_3$ with 3 to 10 times the stoichiometric amount of carbonate or bicarbonate salt required to form a mole of $Ca_2Fe_2(CO_3)_4$ precipitate; and reacting the carbonate precipitate comprising $Ca_2Fe_2(CO_3)_4$ with air at a temperature of from between about 650° C. to about 850° C. to form the complex metal oxide comprising $Ca_2Fe_2O_5$. In certain preferred embodiments, the carbonate or bicarbonate salt is present in an amount of from about 12 to about 40 moles of a carbonate or bicarbonate salt for every mole of $Ca_2Fe_2(CO_3)_4$ produced.

In another embodiment of the present invention, a complex metal oxide comprising $Ca_2Mn_2O_5$ is made by forming a carbonate precipitate comprising $Ca_2Mn_2(CO_3)_4$ by reacting $Ca(NO_3)_2$ and $MnCl_2$ in the presence of 3 to 10 times the stoichiometric amount of bicarbonate; and (b) exposing the carbonate precipitate to conditions effective to form the complex metal oxide. In certain preferred embodiments, the step (b) comprises reacting the carbonate precipitate with air at a temperature of from between about 650° C. to about 850° C. to form the complex metal oxide comprising $Ca_2Mn_2O_5$. In certain preferred embodiments, the carbonate or bicarbonate salt is present in an amount of from at least about 12 moles of bicarbonate salt for every mole of $Ca_2Mn_2(CO_3)_4$ produced and, in other preferred embodiments, from about 12 moles to about 40 moles of a bicarbonate salt for every mole of $Ca_2Mn_2(CO_3)_4$ produced.

In yet another embodiment of the present invention, a complex metal oxide comprising $Ca_2Mn_2O_5$ is made by reacting $Ca(NO_3)_2$ and $MnCl_2$ in the presence of 3 to 10 times the stoichiometric amount of bicarbonate; and reacting the carbonate precipitate comprising $Ca_2Mn_2(CO_3)_4$ with air at a temperature of from between about 650° C. to about 850° C. to form the complex metal oxide comprising $Ca_2Mn_2O_5$. In certain preferred embodiments, the carbonate or bicarbonate salt is present in an amount of from about 12 moles to about 40 moles of a bicarbonate salt for every mole of $Ca_2Mn_2(CO_3)_4$ produced.

In still another embodiment of the present invention, a complex metal oxide comprising $Ca_2Mn_2O_5$ is made by reacting $Ca(NO_3)_2$ and $Mn(NO_3)_2$ in the presence of 3 to 10 times the stoichiometric amount of bicarbonate; and reacting the carbonate precipitate comprising $Ca_2Mn_2(CO_3)_4$ with air at a temperature of from between about 650° C. to about 850° C. to form the complex metal oxide comprising $Ca_2Mn_2O_5$. In certain preferred embodiments, the carbonate or bicarbonate salt is present in an amount of from about 12 moles to about 40 moles of a bicarbonate salt for every mole of $Ca_2Mn_2(CO_3)_4$ produced.

In another embodiment of the present invention, the carbonate precipitate comprises $Ca_2FeMn(CO_3)_5$ and the reacting step (a) comprises reacting water-soluble salts of the cations Ca(II), Mn(II), and Fe(II) with 3 to 10 times the stoichiometric amount of carbonate or bicarbonate salt required for every mole of $Ca_2FeMn(CO_3)_5$ produced.

In yet another embodiment of the present invention, the carbonate precipitate comprises $Ca_2FeMn(CO_3)_5$ and the reacting step (a) comprises reacting at least one water-soluble salt of the cations Ca(II), Mn(II), and Fe(III) with 3 to 10 times the stoichiometric amount of carbonate or bicarbonate salt required for every mole of $Ca_2FeMn(CO_3)_5$ produced.

In another embodiment of the present invention, the carbonate precipitate comprises $Ca_2FeMn(CO_3)_5$ and the reacting step (a) comprises reacting water-soluble nitrate salts of the cations Ca(II), Mn(II), and Fe(III) with 3 to 10 times the stoichiometric amount of carbonate or bicarbonate salt required for every mole of a carbonate precipitate comprising $Ca_2FeMn(CO_3)_5$ produced.

In still another embodiment of the present invention, the reacting step (a) comprises reacting at least one water-soluble salt of the cations Ca(II), Mn(II), and Fe(II) with 3 to 10 times the stoichiometric amount of a compound selected from the group consisting of $NaHCO_3$, $KHCO_3$, $CsHCO_3$, $Na_2CO_3$, and $K_2CO_3$ for every mole of the carbonate precipitate.

In another embodiment of the present invention, the reacting step (a) comprises reacting water-soluble salts of the cations Ca(II), Mn(II), and Fe(III) with 3 to 10 times the stoichiometric amount of a compound selected from the group consisting of $NaHCO_3$, $KHCO_3$, $CsHCO_3$, $Na_2CO_3$, and $K_2CO_3$ for every mole of the carbonate precipitate.

The teachings of the present invention have applicability for large scale (production rates in excess of 1000 standard liters per minute), medium bench scale (production rates between 1000 to 10 standard liters per minute), small scale (production rates less than 10 standard liters per minute) and everything in between.

The following examples are provided for the purpose of further illustrating the present invention but are by no means intended to limit the same.

EXAMPLES

Preparation of Complex Metal Carbonate and Oxide

The reaction conditions used for preparing complex metal carbonates and oxides according to the invention in the experiments of Examples 2-15 are summarized in Table 1. All reagents used were commercially available and obtained from Aldrich Chemicals, Milwaukee, Wis. Commercially available reagents do not generally require pre-treatment or purification before use in the process of the present invention. Although the purity of the reagents is important in most chemical reactions, one of ordinary skill in the art will appreciate that conventional metal-containing reagents are typically contaminated with, for example, other metals that, from a practical standpoint, are difficult to remove. Such contaminants can be tolerated in the process of the present invention. Thus, complex metal oxides such as, for example, $Ca_2FeMnO_5$ produced according to the invention may include impurities in the form of potassium or sodium depending upon the nature of carbonate or bicarbonate salt used to produce the complex metal oxide. The complex metal oxide may also be contaminated with potassium if potassium carbonate or bicarbonate is used in the preparation of complex metal oxide.

TABLE 1

| Example | Stoichiometric times of carbonate or bicarbonate | Moles of carbonate or bicarbonate per mole of product | Precipitation solution composition | Mole M+ inclusion per mole of carbonate or oxide[a,b] | |
|---|---|---|---|---|---|
| | | | | Carbonate | Oxide |
| 2 | 7.6 | 38 | 1.0 M $NaHCO_3$ | 0.260 | 0.284 |
| 3 | 7.9 | 39.5 | 1.0 M $NaHCO_3$ | 0.168 | 0.232 |
| 4 | 7.6 | 38 | 1.0 M $NaHCO_3$ | 0.334 | 0.303 |
| 5 | 4.8 | 24 | 1.0 M $NaHCO_3$ | — | 0.078 |
| 6 | 7.1 | 35.5 | 1.0 M $NaHCO_3$ | 0.232 | 0.303 |
| 7 | 7.1 | 35.5 | 1.0 M $NaHCO_3$ | 0.285 | 0.221 |
| 8 | 7.4 | 37 | 1.0 M $KHCO_3$ | 0.110 | 0.143 |
| 9 | 7.7 | 38.5 | 1.0 M $CsHCO_3$ | 0.023 | 0.015 |
| 10 | 7.4 | 37 | 1.0 M $Na_2CO_3$ | 0.285 | 0.272 |
| 11 | 8 | 40 | 1.1 M $K_2CO_3$ | 0.072 | — |
| 12 | 7.2 | 36 | 1.0 M $NaHCO_3$ | 0.567 | 0.620 |
| 13 | 6.8 | 34 | 1.0 M $NaHCO_3$ | 0.363 | 0.319 |
| 14 | 7.5 | 37.5 | 1.0 M $NaHCO_3$ | 0.318 | 0.351 |
| 15 | 7.3 | 36.5 | 1.1 M $NH_4HCO_3$ | — | — |

[a] As determined by XRF analysis.
[b] M+ represents the alkali metal cation of the precipitation solution, M = Na, K, or Cs.

Performance Testing of Complex Metal Oxide Preparations

The effectiveness of the complex metal oxide $Ca_2FeMnO_5$ was evaluated by using thermogravimetric analysis (TGA). The oxide sample was placed in the TGA apparatus and heated to 700° C. while purging with nitrogen or air. The sample was then exposed to a simulated reformed gas mixture containing $CO_2$ for 30 minutes to chemisorb carbon dioxide. Thereafter, the sample was heated to 750° C. and exposed to air for 30 minutes to regenerate the oxide. The cycling between $CO_2$—containing gas and air was repeated for a minimum of 20 cycles. The observed weight gain under $CO_2$—containing gas resulted from $CO_2$ chemisorption, while the weight loss under air was attributed to $CO_2$ desorption and regeneration of complex metal oxide.

The quantity of $CO_2$ chemisorbed (i.e., capacity) and the reversibility of chemisorption are important factors in assessing the performance of a complex metal oxide for use as a redox material. An experimentally-determined $CO_2$ capacity preferably approximates the theoretical maximum capacity based on a reaction of $Ca_2FeMnO_5$ with $CO_2$, at a molar ratio of 2 moles $CO_2$/mole oxide (or 26.6 weight percent). To maintain capacity with repeated cycling, chemisorption must be fully reversible; that is, the quantity of $CO_2$ chemisorbed must be completely desorbed under air.

Control Example 1

The oxide $Ca_2FeMnO_5$ was synthesized using the procedure disclosed in U.S. patent application Ser. No. 11/165,720.

An aqueous solution was prepared by dissolving $Ca(NO_3)_2 \cdot 4H_2O$, $Fe(NO_3)_3 \cdot 9H_2O$, and $MnCl_2 \cdot 4H_2O$ in deionized water in a 2 to 1 to 1 molar ratio. The resulting solution volume was 195 mL with a $Ca^{2+}$ concentration of 0.50 M. A flask containing 1 L of 1.0 M $NaHCO_3$ was heated to 80° C. and stirred vigorously and gaseous $CO_2$ was bubbled continuously into the flask. The Ca—Fe—Mn solution was added dropwise to the $NaHCO_3$ solution resulting in a brownish precipitate. Once the precipitation was complete, the solid was collected by filtration and rinsed repeatedly. Following brief air drying, the solid was added to 1 L of water, stirred briefly, filtered, and rinsed repeatedly. This washing procedure was repeated a second time. The carbonate product was dried in air at 100° C. for 12 hours in an oven. The oxide $Ca_2FeMnO_5$ was obtained by calcination of the carbonate at 750° C. for 12 hours under flowing air. To obtain the oxide product, the carbonate product in a porcelain crucible was heated in an air purged oven to 100° C. for 2 hours, heated at 2° C./min to 750° C. for 12 hours. The product was a black solid comprising $Ca_2FeMnO_5$. Elemental analysis confirmed the intended composition and also the presence of a significant concentration of sodium, 0.34 mole $Na^+$/mole oxide. Referring to FIG. 1, the PXRD pattern was consistent with the intended oxide.

The $CO_2$ capacity of the complex metal oxide prepared in Control Example 1 in 50 TGA cycles was about 24.7%, as shown in Table 3. No loss in capacity was observed for the complex metal oxide over 50 cycles, which confirmed that the sorption was fully reversible.

Example 2

The synthesis of $Ca_2FeMnO_5$ was accomplished by calcination of a carbonate precursor, nominally $Ca_2FeMn(CO_3)_5$. The carbonate was prepared by precipitation of soluble salts in aqueous $NaHCO_3$ without the addition of $CO_2$ gas as compared to Control Example 1, as follows.

An aqueous solution was prepared by dissolving $Ca(NO_3)_2 \cdot 4H_2O$, $Fe(NO_3)_3 \cdot 9H_2O$, and $MnCl_2 \cdot 4H_2O$ in deionized water in a 2 to 1 to 1 molar ratio. The resulting solution volume was 40 mL with a $Ca^{2+}$ concentration of 0.46 M. A flask containing 300 mL of 1.0 M $NaHCO_3$ was heated to 95° C. and stirred vigorously. The quantity of $NaHCO_3$ corresponded to 7.6 times the stoichiometric amount required for carbonate formation. The Ca—Fe—Mn solution was added dropwise to the $NaHCO_3$ solution in a substantial absence of $CO_2$, resulting in a brownish precipitate. Once the precipitation was complete, the solid carbonate precipitate was collected by filtration and rinsed repeatedly. Following brief air drying, the carbonate precipitate was added to 1 L of water, stirred briefly, filtered, and rinsed repeatedly. This washing procedure was repeated a second time. The carbonate precipitate was dried at 100° C. for 12 hours in an oven with flowing air. To obtain the oxide product, the carbonate precipitate was heated in a porcelain crucible in an oven to 100° C. for 2 hours with continuous exposure to flowing air, then heated at 2° C./min to 750° C. for 12 hours. The product was a black solid comprising $Ca_2FeMnO_5$. Elemental analysis confirmed the intended composition and also the presence of a significant concentration of sodium, 0.26 mole Na$^+$/mole carbonate and 0.28 mole Na$^+$/mole oxide, as shown in Table 1. The PXRD pattern was consistent with the intended oxide as shown in FIG. 1.

FIG. 1 also includes the PXRD pattern for Ca$_2$FeMnO$_5$ obtained as in Control Example 1. The PXRD pattern of the Ca$_2$FeMnO$_5$ prepared in the Example 2 reflects fewer contaminant phases than the PXRD pattern of the Ca$_2$FeMnO$_5$ prepared in the experiment of Control Example 1.

The effectiveness of the Ca$_2$FeMnO$_5$ prepared by Example 2 was evaluated according to the TGA test method detailed above. The complex metal oxide obtained in Example 2 exhibited slightly larger CO$_2$ capacity than the complex metal oxide prepared in Control Example 1. No loss in capacity was observed for the Example 2 complex metal oxide over 50 cycles, which confirmed that the sorption was fully reversible.

Example 3

The carbonate precipitate was prepared one more time using the procedure similar to that used in Example 2. The quantity of NaHCO$_3$ used in this example corresponded to 7.9 times the stoichiometric amount required for carbonate formation. In an attempt to remove the Na$^+$ from product, the carbonate precipitate washed 3 times using 1.0 L 95° C. deionized water. Elemental analysis showed that no significant amount of Na$^+$ had been removed from the carbonate precipitate and it contained 0.17 mole Na$^+$/mole carbonate, as shown above in Table 1. The oxide was obtained by calcination to oxide as in Example 2. XRF analysis was consistent with the intended composition and the presence of 0.23 mole Na$^+$/mole oxide.

Example 4

A variation of the method of Example 2 was used in which the soluble metal salt solution was prepared using Mn(NO$_3$)$_2$ in place of MnCl$_2$. An aqueous solution was prepared by dissolving Ca(NO$_3$)$_2$.4H$_2$O, Fe(NO$_3$)$_3$.9H$_2$O, and Mn(NO$_3$)$_2$.xH$_2$O in deionized water in a 2 to 1 to 1 molar ratio. The value of x was determined by weight loss under heating to be 3.8. The resulting solution volume was 35 mL with a Ca$^{2+}$ concentration of 0.46 M. A flask containing 300 mL of 1.0 M NaHCO$_3$ was heated to 95° C. and stirred vigorously. The quantity of NaHCO$_3$ corresponded to a 7.6 times the stoichiometric amount required for carbonate formation. The Ca—Fe—Mn solution was added dropwise to the NaHCO$_3$ solution in a substantial absence of CO$_2$, resulting in a brownish carbonate precipitate. Once the precipitation was complete, the carbonate precipitate was collected by filtration, rinsed repeatedly and calcined as in Example 2. The PXRD pattern was consistent with that of the intended oxide. XRF analysis confirmed the intended composition and also the presence of a significant concentration of sodium, 0.30 mole Na$^+$/mole oxide, as shown in Table 1.

The complex metal oxide produced in Example 4 exhibited CO$_2$ capacity that was very close to that noted with Example 2, as shown in Table 3. No loss in capacity was observed for the complex metal oxide over 50 cycles, which confirmed that the sorption was fully reversible.

Example 5

A variation of the method of Example 2 was used in which the soluble metal salt solution was added to aqueous NaHCO$_3$ at ambient temperature. An aqueous solution was prepared by dissolving Ca(NO$_3$)$_2$.4H$_2$O, Fe(NO$_3$)$_3$.9H$_2$O, and MnCl$_2$.4H$_2$O in deionized water in a 2 to 1 to 1 molar ratio. The resulting solution volume was 500 mL with a Ca$^{2+}$ concentration of 0.40 M. The Ca—Fe—Mn solution was added dropwise to 2.5 L of 1.0 M NaHCO$_3$ at ambient temperature and stirred vigorously, resulting in formation of a carbonate precipitate. The quantity of NaHCO$_3$ corresponded to 4.8 times the stoichiometric amount required for carbonate formation. When the addition was complete, the reaction mixture was heated to 95° C. with stirring for 1 hour. Following cooling to ambient temperature, the solid carbonate precipitate was collected by filtration, rinsed repeatedly, and dried at 110° C. overnight. The oxide product comprising Ca$_2$FeMnO$_5$ was obtained by calcining the carbonate precipitate as described in Example 2. Elemental analysis confirmed the intended composition and also the presence of 0.08 mole Na$^+$/mole oxide, as shown in Table 1. The PXRD pattern was consistent with the intended oxide.

The complex metal oxide produced in Example 5 exhibited CO$_2$ capacity that was very close to that noted with Example 2, as shown in Table 3. No loss in capacity was observed for the complex metal oxide over 50 cycles, which confirmed that the sorption was fully reversible.

Examples 6 and 7

Higher concentrations of Ca(NO$_3$)$_2$, Fe(NO$_3$)$_3$, and MnCl$_2$ were used to prepare Ca$_2$FeMnO$_5$ by the method of Example 2. Preparations were carried out in which metal ion concentrations were approximately twice and four times as greater as those in Example 2.

In Example 6, a, 50 mL of solution containing 1.0 M Ca(NO$_3$)$_2$ and 0.5 M of both Fe(NO$_3$)$_3$ and MnCl$_2$ was added dropwise to 900 mL of 1.0 M NaHCO$_3$ (7.2 times the stoichiometric amount required for carbonate formation).

In Example 7, 50 mL of a solution containing 2.0 M Ca(NO$_3$)$_2$ and 1.0 M of both Fe(NO$_3$)$_3$ and MnCl$_2$ was added dropwise to 1.8 L of 1.0 M NaHCO$_3$ (7.2 times the stoichiometric amount required for carbonate formation.

For both preparations, workup of the resulting carbonate precipitates and calcination to the oxide was carried out as in Example 2. Elemental analysis confirmed the intended composition. Both oxides contained Na$^+$ as detailed in Table 1. PXRD confirmed that Ca$_2$FeMnO$_5$ was the major phase along with some minor contaminant phases, CaO and CaFe$_2$O$_4$. Both oxides had CO$_2$ capacity equivalent to the oxide prepared by Example 2, as shown in Table 3.

Examples 8-11

Carbonate precipitates were prepared as in Example 2 except that different precipitating solution compositions were used in place of NaHCO$_3$. Details are provided in Table 1.

In Examples 8 and 9, respectively, 1.0 M KHCO$_3$ and 1.0 M CsHCO$_3$ were used in place of NaHCO$_3$.

In Examples 10 and 11, respectively, 1.0 M Na$_2$CO$_3$ and 1.1 M K$_2$CO$_3$ were used in place of the NaHCO$_3$ solution.

Resulting carbonate precipitates were washed, dried, and calcined as in Example 2 to obtain the oxide product Ca$_2$FeMnO$_5$. There were relatively minor variations in PXRD patterns for the oxide products when compared to the product of Example 2. XRF analysis was consistent with the intended compositions. Each product contained some alkali cation as indicated in Table 1. Complex metal oxides prepared in these examples had CO$_2$ capacity close to the oxide prepared by Example 2, as shown in Table 3.

Example 12

The synthesis of $Ca_2Fe_aMn_bO_5$ in which (1) $0 \leq a \leq 2$ and $0 \leq b \leq 2$ and a and b are not simultaneously 0 and a+b=2 can be carried out using the method of Example 2. Such compositions can be obtained by varying the Fe and Mn content to give various oxides of the form $Ca_2Fe_aMn_{2-a}O_5$ where a=0 to 2. Values of between 0 and 2 give compositions such as $Ca_2Fe_{0.5}Mn_{1.5}O_5$ for a=0.5. $Ca_2Fe_{0.5}Mn_{1.5}O_5$ was obtained by using an aqueous solution containing a 2 to 0.5 to 1.5 molar ratio of $Ca(NO_3)_2.4H_2O$, $Fe(NO_3)_3.9H_2O$, and $MnCl_2.4H_2O$ in deionized water and the method of Example 2. The quantity of $NaHCO_3$ used in this example corresponded to 7.2 times the stoichiometric amount required for carbonate formation. Following the formation of the carbonate precipitate, the solid washed, dried and calcined as in Example 2. The PXRD pattern and elemental analysis of the oxide product were consistent with the intended composition. The oxide contained 0.62 mol $Na^+$/mol oxide, as shown in Table 1. Complex metal oxides prepared in this example had $CO_2$ capacity slightly lower than the oxide prepared by Example 2, as shown in Table 3.

Example 13

The synthesis of $Ca_2Fe_{1.5}Mn_{0.5}O_5$ was carried out using the method of Example 12 in which an aqueous solution containing a 2 to 1.5 to 0.5. molar ratio of $Ca(NO_3)_2.4H_2O$, $Fe(NO_3)_3.9H_2O$, and $MnCl_2.4H_2O$ in deionized water was used. The quantity of $NaHCO_3$ used in this example corresponded to 6.8 times the stoichiometric amount required for carbonate formation. Following the formation of the carbonate precipitate, the solid washed, dried and calcined as detailed in Example 2. The PXRD pattern and elemental analysis of the oxide product were consistent with the intended composition. The oxide contained 0.62 mol $Na^+$/mol oxide, as shown in Table 1. Complex metal oxides prepared in this example had $CO_2$ capacity higher than the oxide prepared by Example 2, as shown in Table 3.

Example 14

Other complex metal oxides can be synthesized using the method of Example 2, as illustrated by the following preparation of $Ca_2Fe_2O_5$.

Equimolar quantities of $Ca(NO_3)_2.4H_2O$ and $FeCl_2.4H_2O$ were dissolved to yield 50 mL of solution with 0.49 M of each metal ion. The solution was added dropwise to 450 mL 1.0 M $NaHCO_3$ at 95° C. The quantity of $NaHCO_3$ used in this example orresponded to 6.8 times the stoichiometric amount required for carbonate formation. The bicarbonate solution was stirred vigorously during the addition. The resulting light green solid carbonate precipitate comprising $Ca_2Fe_2(CO_3)_4$ was collected by filtration, washed repeatedly, and dried at 100° C. overnight. The carbonate precipitate was then calcined as detailed in Example 2 to yield $Ca_2Fe_2O_5$ as confirmed by PXRD. XRF analysis confirmed the intended composition with 0.35 mole $Na^+$/mole oxide, as shown in Table 1. Complex metal oxides prepared in this example had $CO_2$ capacity similar to the oxide prepared by Example 2, as shown in Table 3.

Example 15

The synthesis of another complex metal oxide using a modification of the method of Example 2 is illustrated by the following preparation of $Ca_2Mn_2O_5$. An aqueous solution was prepared by dissolving $Ca(NO_3)_2.4H_2O$ and $MnCl_2.4H_2O$ in deionized water in a 1 to 1 molar ratio. The resulting solution volume was 40 mL with a $Ca^{2+}$ concentration of 0.52 M. A flask containing 285 mL of 1.0 M $NH_4HCO_3$ at room temperature was stirred vigorously. The quantity of $NH_4HCO_3$ used in this example corresponded to 7.3 times the stoichiometric amount required for carbonate formation. The Ca—Mn solution was added dropwise to the $NH_4HCO_3$ solution, resulting in an off-white precipitate. Following the formation of the carbonate precipitate, the solid was washed, dried and calcined as in Example 2. The PXRD pattern and elemental analysis of the oxide product were consistent with the intended composition. Complex metal oxides prepared in this example had $CO_2$ capacity substantially lower than the oxide prepared by Example 2, as shown in Table 3. Therefore, it does not appear to be desirable to use ammonium bicarbote for the preparation of complex metal carbonate and respective complex metal oxide.

Examples 16-18

A variation of the method of Example 8 was used to determine the range of $KHCO_3$ concentration required for precipitation of the complex carbonate, $Ca_2FeMn(CO_3)_n$, in a substantial absence of $CO_2$. In Example 8, the quantity of $KHCO_3$ was 7.4 times the stoichiometric amount required for formation of the complex carbonate formation. A lower quantity of $KHCO_3$, only 1.5 times the stoichiometric amount required for complex carbonate formation, was used in Example 16. In Examples 17 and 18, the quantity of $KHCO_3$ used was 3 and 5 times the stoichiometric amount required for complex carbonate formation, respectively. The resulting complex carbonates were calcined to the corresponding oxides as described in Example 2.

Elemental analysis listed in Table 2 shows that the complex metal oxide product of Example 16 was deficient in calcium relative to those of Examples 17 and 18.

TABLE 2

| Example | Times Stoichiometric amount of $KHCO_3$ used | Weight % Ca | Weight % Fe | Weight % Mn | Molar ratio in oxide product Ca/Fe | Molar ratio in oxide product Ca/Mn |
|---|---|---|---|---|---|---|
| 16 | 1.5 | 19.45 | 19.29 | 20.81 | 1.40 | 1.28 |
| 17 | 3.0 | 25.60 | 18.27 | 18.39 | 1.95 | 1.91 |
| 18 | 5.0 | 25.70 | 18.20 | 18.33 | 1.97 | 1.92 |

More critical is the significantly lower $CO_2$ sorption capacity for the oxide of Example 16 relative to the oxides produced in Examples 8, 17 and 18, as shown in Table 3. This illustrates that greater than a 1.5 times the stoichiometric amount of bicarbonate is required for the synthesis of the complex metal carbonate in a substantial absence of $CO_2$ and subsequent calcination to a complex oxide with a maximum $CO_2$ sorption capacity.

TABLE 3

| | Precipitation Solution composition | oxide composition | $CO_2$ adsorption, wt % 1st cycle | $CO_2$ adsorption, wt % 21th cycle | $CO_2$ adsorption, wt % 50th cycle |
|---|---|---|---|---|---|
| 2 | $NaHCO_3$ | $Ca_2FeMnO_5$ | 24.37 | 24.83 | 25.28 |
| 4 | $NaHCO_3$ | $Ca_2FeMnO_5$ | 23.87 | 24.87 | 24.83 |
| 6 | $NaHCO_3$ | $Ca_2FeMnO_5$ | 24.45 | 25.22 | 25.34 |

TABLE 3-continued

| Example | Precipitation Solution composition | oxide composition | CO$_2$ adsorption, wt % 1$^{st}$ cycle | 21$^{th}$ cycle | 50$^{th}$ cycle |
|---|---|---|---|---|---|
| 7 | NaHCO$_3$ | Ca$_2$FeMnO$_5$ | 24.64 | 25.05 | 25.28 |
| 8 | KHCO$_3$ | Ca$_2$FeMnO$_5$ | 23.45 | 23.67 | 23.92 |
| 9 | CsHCO$_3$, | Ca$_2$FeMnO$_5$ | 23.37 | 23.44 | 23.42 |
| 10 | Na$_2$CO$_3$ | Ca$_2$FeMnO$_5$ | 23.79 | 24.38 | — |
| 11 | K$_2$CO$_3$ | Ca$_2$FeMnO$_5$ | 23.40 | 23.20 | 23.29 |
| 12 | NaHCO$_3$ | Ca$_2$Fe$_{0.5}$Mn$_{1.5}$O$_5$ | 21.50 | 21.90 | 22.17 |
| 13 | NaHCO$_3$ | Ca$_2$Fe$_{1.5}$Mn$_{0.5}$O$_5$ | 27.61 | 27.96 | 27.86 |
| 14 | NaHCO$_3$ | Ca$_2$Fe$_2$O$_5$ | 28.79 | 27.42 | 25.00 |
| 15 | NH$_4$HCO$_3$ | Ca$_2$Mn$_2$O$_5$ | 19.54 | 21.04 | 20.89 |
| 16 | KHCO$_3$ | Ca$_2$FeMnO$_5$ | 18.66 | 18.52 | 18.59 |
| 17 | KHCO$_3$ | Ca$_2$FeMnO$_5$ | 24.21 | 25.11 | 25.35 |
| 18 | KHCO$_3$ | Ca$_2$FeMnO$_5$ | 24.44 | 25.43 | 25.77 |
| 1 | Control Example | Ca$_2$FeMnO$_5$ | 24.22 | 24.56 | 24.69 |

The foregoing examples and description of the preferred embodiments should be taken as illustration, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

All patents, patent applications and publications mentioned in this specification are herein incorporated by reference to the same extent as if each individual reference was specifically and individually indicated to be incorporated by reference.

What is claimed is:

1. A process for making a complex metal oxide comprising the formula

wherein
A is at least one metallic element selected from the group consisting of elements of Groups 2, and 3, and the Lanthanide elements of the IUPAC Periodic Table of the Elements, which has an oxidation state ranging from +1 to +3;
B is at least one metallic element having an oxidation state ranging from +1 to +7 selected from the group consisting of vanadium, chromium, manganese, iron, cobalt, copper, and nickel;
O is an oxygen atom;
x is a number from about 1 to about 10;
y is a number greater than 0 and equal to or less than about 10 for each element B; and
z is a number that renders the complex metal oxide substantially charge neutral,
the process comprising the steps of:
(a) reacting in a solution at a temperature of between about 75° C. to about 100° C. at least one water-soluble salt of A, at least one water-soluble salt of B and a stoichiometric amount of a carbonate salt or bicarbonate salt required to form each mole of a carbonate precipitate represented by the formula

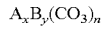

wherein n is a number that renders the carbonate precipitate charge neutral,
wherein the reacting is conducted in a substantial absence of carbon dioxide to form the carbonate precipitate and wherein the molar amount of carbonate salt or bicarbonate salt is at least three times the stoichiometric amount of carbonate or bicarbonate salt required to form each mole of the carbonate precipitate, and wherein the carbonate salt or bicarbonate salt is selected from the group consisting of NaHCO$_3$, KHCO$_3$, CsHCO$_3$, Na$_2$CO$_3$, and K$_2$CO$_3$; and
(b) reacting the carbonate precipitate with an oxygen containing gas at a temperature of from between about 650° C. to about 1,200° C. to form the complex metal oxide.

2. The process of claim 1 wherein the complex metal oxide comprises a complex metal oxide selected from the group consisting of Ca$_2$Fe$_{0.5}$Mn$_{1.5}$O$_5$, Ca$_2$Fe$_{1.5}$Mn$_{0.5}$O$_5$, Ca$_2$Fe$_2$O$_5$, and Ca$_2$Mn$_2$O$_5$.

3. The process of claim 1 wherein the complex metal oxide comprises Ca$_2$FeMnO$_5$ and wherein the reacting step (a) comprises reacting Ca(NO$_3$)$_2$, MnCl$_2$, and Fe(NO$_3$)$_3$ with 3 to 10 times the stoichiometric amount of carbonate or bicarbonate salt required to form each mole of Ca$_2$FeMn(CO$_3$)$_5$ precipitate; and the reacting step (b) comprises reacting the carbonate precipitate comprising Ca$_2$FeMn(CO$_3$)$_5$ with air at a temperature of from between about 650° C. to about 950° C. to form the complex metal oxide comprising Ca$_2$FeMnO$_5$.

4. The process of claim 1 wherein the complex metal oxide comprises Ca$_2$FeMnO$_5$ and wherein the reacting step (a) comprises reacting Ca(NO$_3$)$_2$, Mn(NO$_3$)$_2$, and Fe(NO$_3$)$_3$ with from 3 to 10 times the stoichiometric amount of carbonate or bicarbonate salt required to form each mole of Ca$_2$FeMn(CO$_3$)$_5$ precipitate; and the reacting step (b) comprises reacting the carbonate precipitate comprising Ca$_2$FeMn(CO$_3$)$_5$ with air at a temperature of from between about 650° C. to about 950° C. to form the complex metal oxide comprising Ca$_2$FeMnO$_5$.

5. The process of claim 1 wherein the carbonate precipitate comprises Ca$_2$FeMn(CO$_3$)$_5$ and wherein the reacting step (a) comprises reacting at least one water-soluble salt of the cations Ca(II), Mn(II), and Fe(II) with 3 to 10 times the stoichiometric amount of carbonate or bicarbonate salt required to form each mole of Ca$_2$FeMn(CO$_3$)$_5$.

6. The process of claim 1 wherein the carbonate precipitate comprises Ca$_2$FeMn(CO$_3$)$_5$ and wherein the reacting step (a) comprises reacting water-soluble salts of the cations Ca(II), Mn(II), and Fe(III) with 3 to 10 times the stoichiometric amount of carbonate or bicarbonate salt required to form each mole of Ca$_2$FeMn(CO$_3$)$_5$.

7. The process of claim 1 wherein the complex metal oxide comprises one or more of:
Ca$_2$Mn$_i$Fe$_m$O$_q$ where $0 \leq i \leq 2$ and $0 \leq m \leq 2$, wherein i+m=2 and $4 \leq q \leq 7$;
Ca$_{2-x}$Mg$_x$Mn$_y$Fe$_z$O$_n$ where $0.1 < x < 0.9$; $0 \leq y \leq 2$ and $0 \leq z \leq 2$, wherein y+z=2 and $4 \leq n \leq 7$;
Ca$_2$FeMnO$_5$;
Ca$_2$Fe$_2$O$_5$;
Ca$_2$Co$_2$O$_5$;
Ca$_2$Mn$_2$O$_5$;
CaMgFeMnO$_5$; and
Ca$_{2-p}$Ln$_p$Fe$_z$Mn$_y$O$_n$ wherein $0.1 < p < 0.9$, $0 \leq y \leq 2$ and $0 \leq z \leq 2$, wherein y+z=2 and $0 \leq p \leq 1$, Ln is an element from the Lanthanide series of elements and n is a value chosen so as to render the complex metal oxide charge neutral.

8. The process of claim 2 wherein the complex metal oxide comprises Ca$_2$Fe$_2$O$_5$.

9. The process of claim 8 wherein the reacting step (a) comprises reacting Ca(NO$_3$)$_2$ and FeCl$_2$ with 3 to 10 times the stoichiometric amount of carbonate or bicarbonate salt required to form each mole of $Ca_2Fe_2(CO_3)_4$ precipitate; and the reacting step (b) comprises reacting the carbonate precipitate comprising $Ca_2Fe_2(CO_3)_4$ with air at a temperature of from between about 650° C. to about 850° C. to form the complex metal carbonate comprising $Ca_2Fe_2O_5$.

10. The process of claim 8 wherein the reacting step (a) comprises reacting $Ca(NO_3)_2$ and $Fe(NO_3)_3$ with 3 to 10 times the stoichiometric amount of carbonate or bicarbonate salt required to form each mole of $Ca_2Fe_2(CO_3)_4$ precipitate; and the reacting step (b) comprises reacting the carbonate precipitate comprising $Ca_2Fe_2(CO_3)_4$ with air at a temperature of from between about 650° C. to about 850° C. to form the complex metal oxide comprising $Ca_2Fe_2O_5$.

11. The process of claim 1 wherein the complex metal oxide comprises $Ca_2FeMnO_5$ and wherein the reacting step (a) comprises reacting $Ca(NO_3)_2$, $MnCl_2$, and $Fe(NO_3)_3$ with from 3 to 10 times the stoichiometric amount of a compound selected from the group consisting of $NaHCO_3$, $KHCO_3$, $CsHCO_3$, $Na_2CO_3$, and $K_2CO_3$ for every mole of the carbonate precipitate comprising $Ca_2FeMn(CO_3)_5$: and the reacting step (b) comprises reacting the carbonate precipitate comprising $Ca_2FeMn(CO_3)_5$ with air at a temperature of from between about 650° C. to about 950° C. to form the complex metal oxide comprising $Ca_2FeMnO_5$.

12. The process of claim 2 wherein the complex metal oxide comprises $Ca_2Mn_2O_5$.

13. The process of claim 12 wherein the reacting step (a) comprises reacting $Ca(NO_3)_2$ and $MnCl_2$ with from 3 to 10 times the stoichiometric amount of carbonate or bicarbonate salt required to form each mole of the carbonate precipitate comprising $Ca_2Mn_2(CO_3)_4$; and the reacting step (b) comprises reacting the carbonate precipitate comprising $Ca_2Mn_2(CO_3)_4$ with air at a temperature of from between about 650° C. to about 850° C. to form the complex metal oxide comprising $Ca_2Mn_2O_5$.

14. The process of claim 12 wherein the reacting step (a) comprises reacting $Ca(NO_3)_2$ and $Mn(NO_3)_2$ with 3 to 10 times the stoichiometric amount of carbonate or bicarbonate salt required to form each mole of the carbonate precipitate comprising $Ca_2Mn_2(CO_3)_4$; and the reacting step (b) comprises reacting the carbonate precipitate comprising $Ca_2Mn_2(CO_3)_4$ with air at a temperature of from between about 650° C. to about 850° C. to form the complex metal oxide comprising $Ca_2Mn_2O_5$.

15. The process of claim 1 wherein the reacting step (a) comprises reacting at least one water-soluble salt of the cations Ca(II), Mn(II), and Fe(II) with 3 to 10 times the stoichiometric amount of a compound selected from the group consisting of $NaHCO_3$, $KHCO_3$, $CsHCO_3$, $Na_2CO_3$, and $K_2CO_3$ for every mole of the carbonate precipitate.

16. The process of claim 1 wherein the reacting step (a) comprises reacting water-soluble salts of the cations Ca(II), Mn(II), and Fe(III) with 3 to 10 times the stoichiometric amount of a compound selected from the group consisting of $NaHCO_3$, $KHCO_3$, $CsHCO_3$, $Na_2CO_3$, and $K_2CO_3$ for every mole of the carbonate precipitate.

17. The process of claim 1 wherein the complex metal oxide comprises $Ca_2FeMnO_5$ and wherein the reacting step (a) comprises reacting molar quantities of $Ca(NO_3)_2$, $MnCl_2$, and $Fe(NO_3)_3$ such that the molar ratio of Ca to the sum of Fe to Mn is equal to 1 and the molar ratios of Fe and Mn to Ca range from 0 to 1 with 3 to 10 times the stoichiometric amount of carbonate or bicarbonate salt required to form each mole of the carbonate precipitate comprising $Ca_2FeMn(CO_3)_5$; and the reacting step (b) comprises reacting the carbonate precipitate comprising $Ca_2FeMn(CO_3)_5$ with air at a temperature of from between about 650° C. to about 950° C. to form the complex metal oxide comprising $Ca_2FeMnO_5$.

18. The process of claim 1
wherein the at least one water-soluble salt of A is a nitrate salt of A, and the at least one water-soluble salt of B is a nitrate salt of B; and
wherein the oxygen containing gas is air.

19. The process of claim 18 wherein the carbonate precipitate comprises $Ca_2FeMn(CO_3)_5$ and wherein the reacting step (a) comprises reacting water-soluble nitrate salts of the cations Ca(II), Mn(II), and Fe(II) with 3 to 10 times the stoichiometric amount of carbonate or bicarbonate salt required to form each mole of the carbonate precipitate comprising $Ca_2FeMn(CO_3)_5$.

20. The process of claim 18 wherein the carbonate precipitate comprises $Ca_2FeMn(CO_3)_5$ and wherein the reacting step (a) comprises reacting water-soluble nitrate salts of the cations Ca(II), Mn(II), and Fe(III) with 3 to 10 times the stoichiometric amount of carbonate or bicarbonate salt required to form each mole of the carbonate precipitate comprising $Ca_2FeMn(CO_3)_5$.

* * * * *

UNITED STATES PATENT AND TRADEMARK OFFICE
CERTIFICATE OF CORRECTION

| | | |
|---|---|---|
| PATENT NO. | : 7,897,128 B2 | Page 1 of 1 |
| APPLICATION NO. | : 11/737942 | |
| DATED | : March 1, 2011 | |
| INVENTOR(S) | : Robert Quinn et al. | |

It is certified that error appears in the above-identified patent and that said Letters Patent is hereby corrected as shown below:

Column 16

Line 51, delete "$0 \leq y \leq 2$" and insert -- $0 \leq y \leq 2$ --

Signed and Sealed this
Twenty-first Day of June, 2011

David J. Kappos
*Director of the United States Patent and Trademark Office*